US005483430A

United States Patent [19]

Stapel et al.

[11] Patent Number: 5,483,430

[45] Date of Patent: Jan. 9, 1996

[54] MULTI-FACETED LIGHT REFLECTOR

[75] Inventors: William C. Stapel, Dearborn; Bernardus J. Stapel, Dearborn Heights, both of Mich.

[73] Assignee: Ford Motor Company, Dearborn, Mich.

[21] Appl. No.: 254,716

[22] Filed: Jun. 6, 1994

[51] Int. Cl.[6] .................... B60Q 1/24; F21V 7/04

[52] U.S. Cl. .................... 362/348; 362/297; 362/61

[58] Field of Search .................... 362/61, 346, 297, 362/348

[56] References Cited

U.S. PATENT DOCUMENTS

| | | | |
|---|---|---|---|
| 4,704,661 | 11/1987 | Kosmatka | 362/61 |
| 4,754,373 | 6/1988 | Otto et al. | 362/61 |
| 4,825,343 | 4/1989 | Nakata | 362/61 |
| 4,825,344 | 4/1989 | Ichihara et al. | 362/346 |
| 4,916,585 | 4/1990 | Nino | 362/346 |
| 4,922,389 | 5/1990 | Nino | 362/61 |
| 4,930,051 | 5/1990 | Golz | 362/61 |
| 5,079,677 | 1/1992 | Kumagai | 362/61 |
| 5,086,376 | 2/1992 | Blussean | 362/346 |
| 5,117,343 | 5/1992 | Kerscher et al. | 362/346 |
| 5,172,972 | 12/1992 | Terao | 362/346 |

*Primary Examiner*—Ira S. Lazarus
*Assistant Examiner*—L. Heyman
*Attorney, Agent, or Firm*—Kevin G. Mierzwa; Roger L. May

[57] ABSTRACT

A multi-faceted light reflector has a reflecting surface with a plurality of adjacent facets, a light source placed in a predetermined spatial relationship to the reflecting surface, and an image surface placed in a predetermined spatial relationship to the light source and the reflecting surface. Each facet has a plurality of edges bounding each facet with each edge joining an edge of an adjacent facet to define a common edge between the two adjacent facets. The surface of the facet generally has three curvature regions. The first region is a base curvature surface portion formed in a predetermined relation to the light source and the image surface for illuminating a predetermined first area of the image surface. The second region is an edge curvature surface portion of each facet adjacent the edges for illuminating a second area of the image surface displaced in predetermined angular relation to the base portion. The third region is an intermediate curvature surface portion which continuously and smoothly connects the base curvature surface portion and the edge curvature surface portion. The intermediate curvature portion illuminates a third area between the first area and the second area.

2 Claims, 4 Drawing Sheets

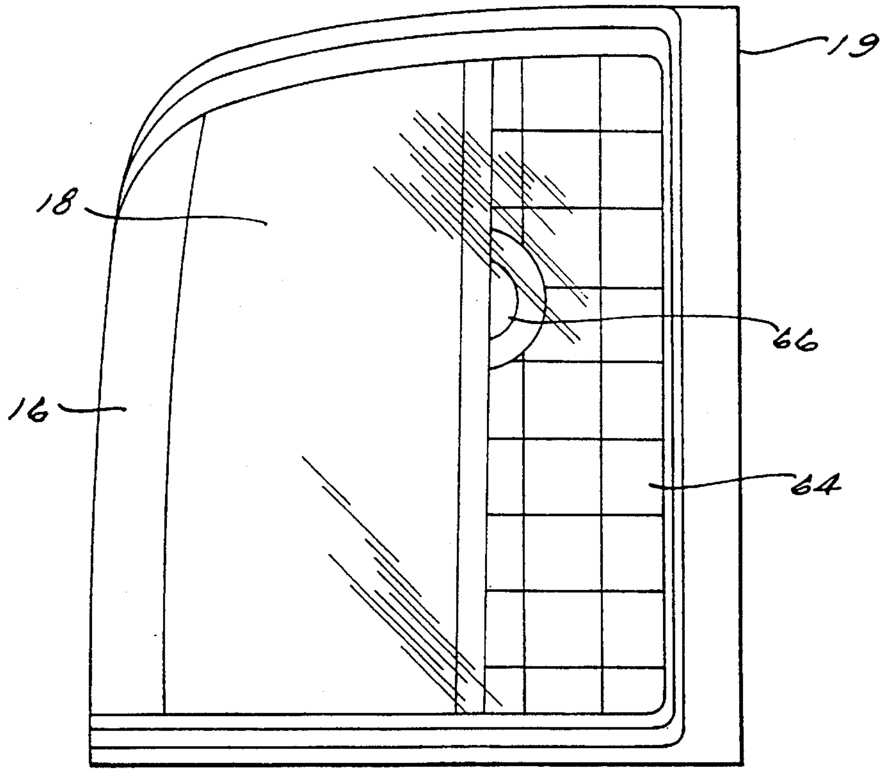
FIG. 8.
FIG. 9.
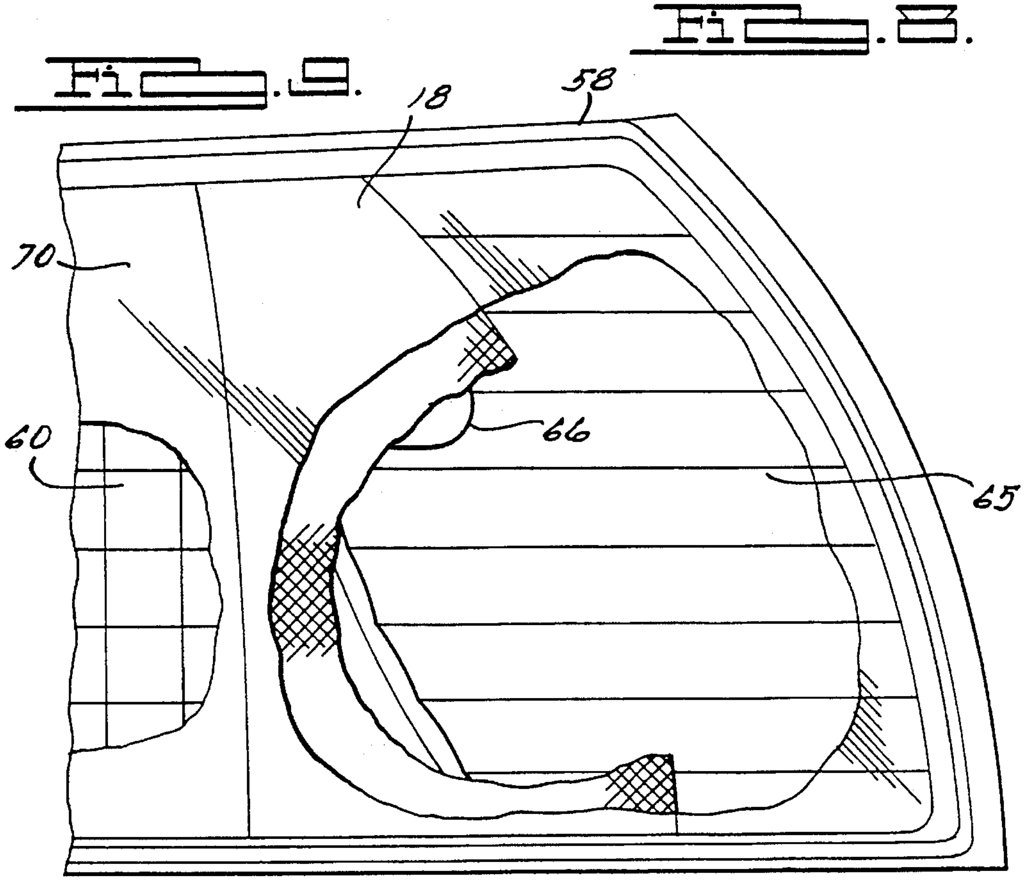

MULTI-FACETED LIGHT REFLECTOR

BACKGROUND OF THE INVENTION

The present invention relates generally to light reflectors for exterior automotive lighting applications and more specifically to a multi-faceted light reflector having each facet aligned in a predetermined manner to obtain a desirable aggregate light distribution.

Several methods are used for controlling the light distribution from a light reflector. In U.S. Pat. No. 4,825,343, a projector headlamp is disclosed which uses a reflective surface which has a series of minute planar face elements for directing light from a light source in front of the reflecting surface to a predetermined region on a shade. The shade is used to mask a portion of light output. The face elements are arranged in a series of adjacent vertical columns to form the reflective surface. Each face element in a vertical column is aimed at a common point on the shade.

The '343 patent has several embodiments which describe the mirrored surface as having distinct regions which provide a function with respect to the light in different ways. The functions of some of the regions change drastically from their adjacent regions. These drastic changes in function generally result in either a discontinuity between adjacent vertical columns or a misdirection of light. One drawback to such a system is that light distribution cannot be precisely controlled since a shade must be employed to block out a portion of the light output from the bulb, i.e., light having an upward directional component. Another drawback to such a system is that discontinuities between the individual steps on the base structure surface promotes the buildup of reflective coating which is adhered to the surface by spraying which in effect causes uncontrolled and unpredictable light scattering. Yet another drawback to such a projector type headlamp is that the light pattern is of such a shape that a convex lens must be employed to obtain a proper light distribution pattern.

Another U.S. Pat. No. 4,704,661, describes a multi-faceted headlamp reflector having distinct bending and spreading facets formed of parabolic sections. The parabolic facet size is a function of the amount of bending and spreading required. Because the parabolic section size is directly dependent on its function, the overall package size is fixed which allows little flexibility in overall design. Another drawback to such a configuration is that distinct steps are formed by the bending and spreading facets. The stepped facets have the drawback that when the facets are sprayed with reflective coating, the reflective coating tends to build up on the corners of the edges of each step and cause an uncontrolled diffusion of the light.

In automotive design, lighting engineers are typically given a package design to work within. Lighting engineers are increasingly given reduced package sizes while still having to maintain a required light distribution. It would therefore be desirable to provide a light reflector without having stepped surface to control the light output.

SUMMARY OF THE INVENTION

One advantage of the present invention is that the light output from the reflective surface is controlled without the use of a shade or an optically refractive device while still allowing design flexibility in the overall package design.

Another advantage is that adjacent facets have common edges which promote a controlled light reflection from the reflective surface.

The present invention has a reflecting surface with a plurality of adjacent facets, a light source placed in a predetermined spatial relationship to the reflecting surface, and an image surface placed in a predetermined spatial relationship to the light source and the reflecting surface. Each facet has a plurality of edges bounding each facet with each edge joining an edge of an adjacent facet to define a common edge between the two adjacent facets. The surface of the facet generally has three curvature regions. The first region is a base curvature surface portion formed in a predetermined relation to the light source and the image surface for illuminating a predetermined first area of the image surface. The second region is an edge curvature surface portion adjacent the edges for illuminating a second area of the image surface displaced in predetermined angular relation to the base portion. The third region is an intermediate curvature surface portion which continuously and smoothly connects the base curvature surface portion and the edge curvature surface portion. The intermediate curvature portion illuminates a third area between the first area and the second area.

BRIEF DESCRIPTION OF THE DRAWINGS

FIG. 8 is a front view of an automobile showing a cornering/turn signal lamp assembly using reflectors according to the present invention.

FIG. 9 is a side view of the automobile of a cornering/turn signal lamp assembly.

DETAILED DESCRIPTION OF THE PREFERRED EMBODIMENT

Figure 1:
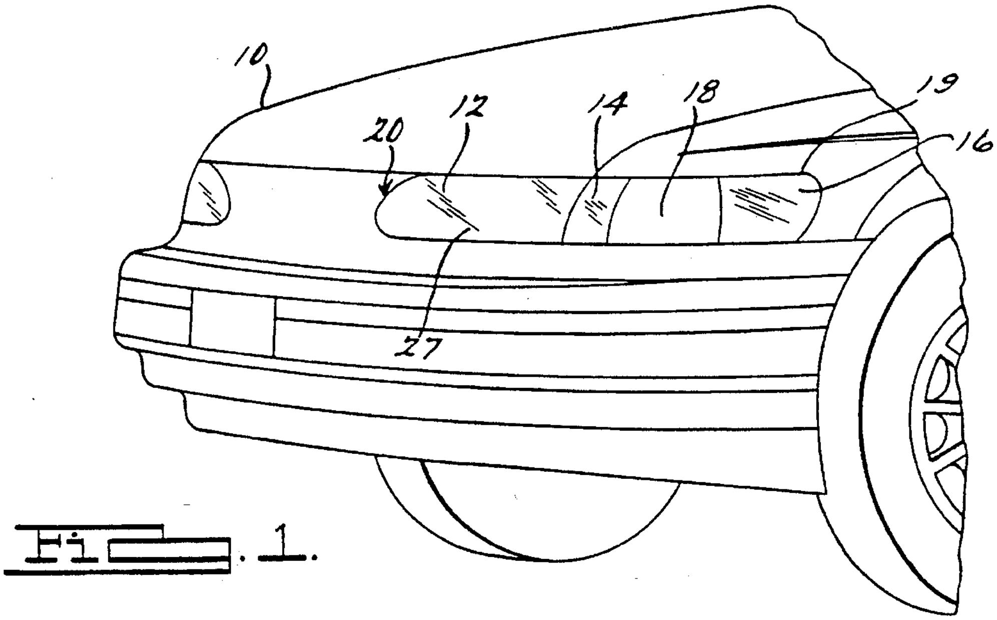
FIG. 1 is a perspective view of a front corner of an automobile having a cornering lamp and headlight according to the present invention.

Referring to FIG. 1, an automotive vehicle 10 has a headlamp assembly 12, a turn signal 14, a cornering lamp 16, and a retro-reflector 18. Headlamp assembly 12 is used to illuminate a planar road surface (not shown) in front of the vehicle 10. A headlamp cover 27 which is preferably optically neutral encloses the headlamp assembly 12. As shown, turn signal 14, cornering lamp 16, and retro-reflector 18 are enclosed within a common housing 19.

Figure 2:
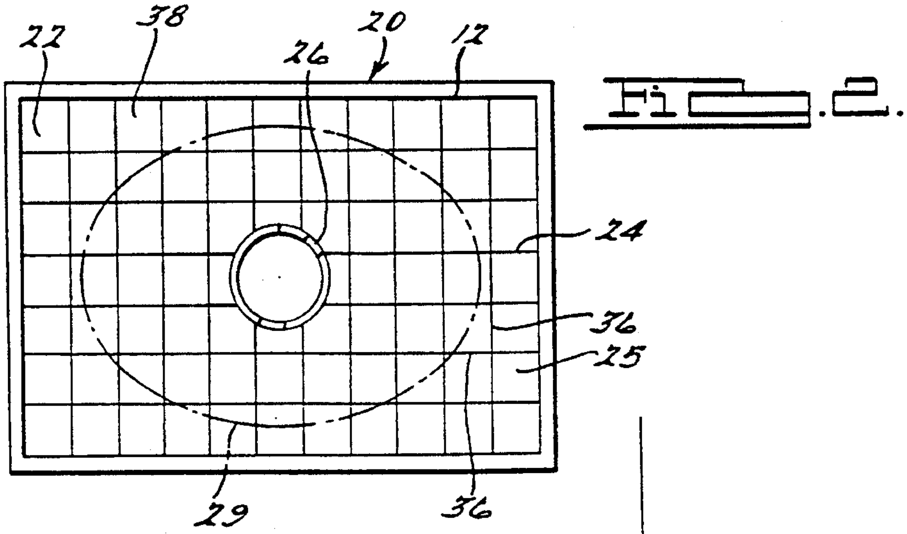
FIG. 2 is a front view of a faceted surface of a headlamp according to the preferred embodiment of the present invention.
Figure 3:
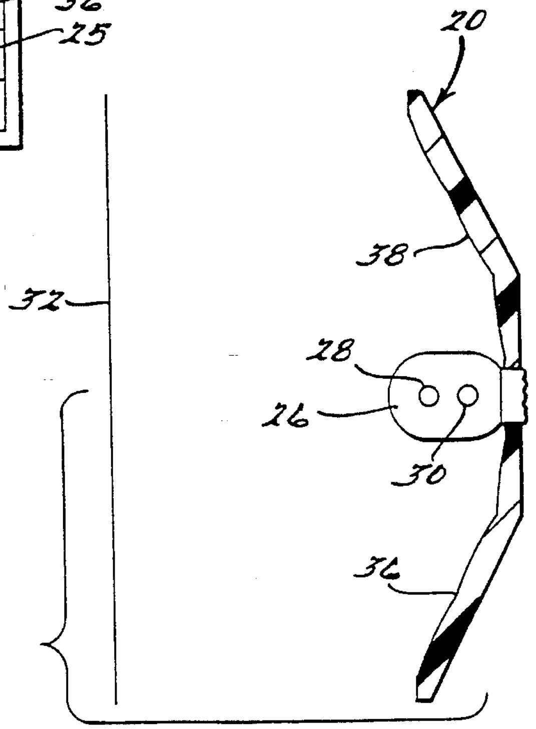
FIG. 3 is a cross sectional view of a headlamp through section 3—3 of FIG. 2 in relation to an image screen.

Referring now to FIGS. 2–3, headlamp assembly 12 has a housing 20, a reflective surface 24 and a light source 26. Reflective surface 24 is formed of a plurality of facets 22. In automotive design, lighting designers are typically given a package size to work within. Reflecting surface 24 is a generally concave curved surface which fits within the given package design constraints. For simplicity, the outer shape is shown as a rectangle, however, other shapes such as an oval (shown by dashed line 29), circle or other aesthetically pleasing design may be used.

Each of the individual facets 22 is generally rectangular in shape and has a generally smooth and continuous curved facet surface 38 without discontinuities. The shape of the facet will be described in more detail in conjunction with FIG. 4 below. The facet surface 38 of each of the individual facets 22 are bounded by facet edges 36. If the reflector design is used for a headlamp of an automobile, edges 36 are preferably designed so that they are either parallel or normal to the plane of the road (not shown). However, they may also be placed in an angular relation to the plane of the road.

Facets 22 in combination form reflecting surface 24. Each pair of adjacent facets preferably has a common facet edge 36 which form common transition edges or points and thereby eliminating discontinuities between facets.

Facets 22 are molded into housing 20 which is typically made of plastic. After the housing is molded, a reflective coating 25 is sprayed on the surface of facets 22. Reflective coating 25 is typically a material such as aluminum and is commonly known in the art.

Headlamp assembly 12 has a bulb 26 carried in a fixed spatial relation to reflecting surface 24. In an automotive vehicle a high beam and a low beam lamp are provided. One such method of implementing both the high beam and low beam into a vehicle is by providing a single bulb 26 with two filaments; a high beam filament 28 and a low beam filament 30. High beam filament 28 and low beam filament 30 are fixed in a predetermined relation with reflecting surface 24 so that light generated from each of the filaments is reflected from reflecting surface 24 to an image surface 32 in a known manner as further described below.

Figure 4:
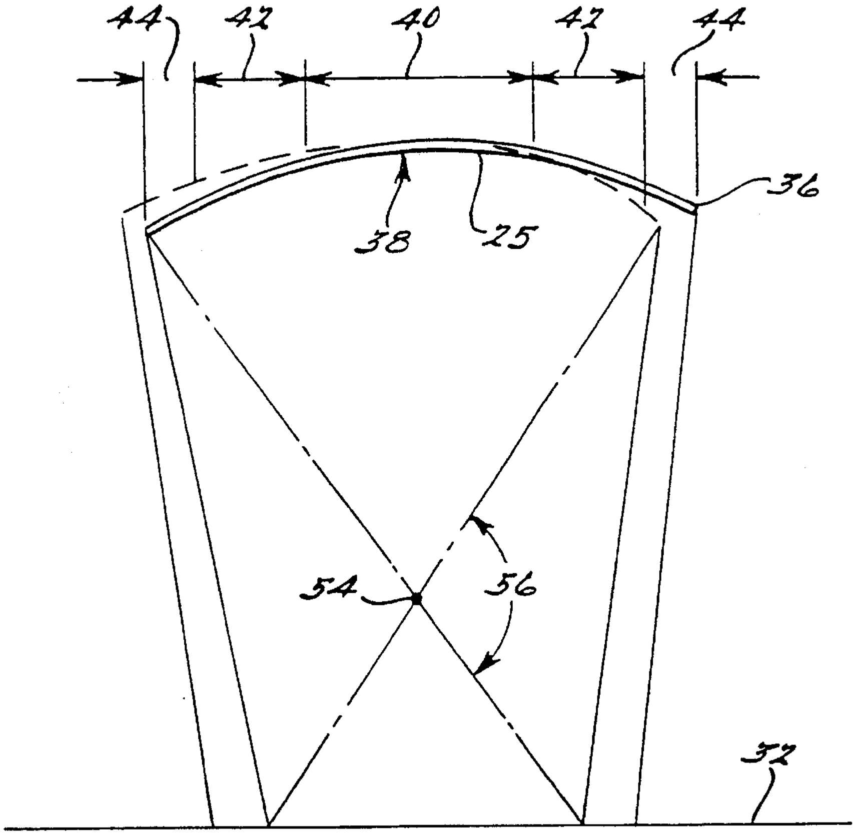
FIG. 4 is a top view of a single facet of a reflecting surface.

Referring now to FIG. 4, a single facet 22 has a facet surface 38 which can be described in terms of several regions. Facet surface 38 has a base curve region 40, an intermediate curve region 42 and an edge region 44. Base curvature region 40 typically covers the largest area of facet surface 38. The shape of base curvature region 40 is geometrically determined as a function of where facet 22 is in relation to light bulb 26 and what the desired reflection is on image surface 32.

Edge curvature region 44 is located adjacent to edge 36. The shape of edge curvature region 44 is manipulated so that a common edge 36 is formed between adjacent facets while minimizing the difference from base curvature region 40. Consequently, edge region 44 has a surface curvature which directs light at a slightly different angle than base curvature region 40. Slight variations in the curvature of reflective surface can amount to an overall greater or lesser reflected area, which is commonly referred to as a patch, depending if the facet surface is varied away from or closer to image screen 32. The amount edge curvature region 44 varies from base curvature region 40 is represented by angle 46 and depends on the location of the adjacent facet. Angle 46 is preferably reduced as low as possible (e.g., typically the range is between 0.001° to 0.1°) in order to maintain a controlled light distribution on image surface 32.

If a smooth transition is required between adjacent facets, surface normals on adjacent edge curvature regions 44 should have substantially the same direction. If a scalloped appearance is desired, the direction of a surface normal on one edge curvature region 44 may vary from an edge curvature region 44 of an adjacent facet.

Intermediate curvature region 42 is located between the base curvature region 40 and edge curvature region 44. The desired light reflection on the image surface 32 is accomplished connecting base curvature region 40 and edge curvature region 44. Intermediate curvature region 42 continuously and smoothly connects the two regions so that no discontinuities are formed in the facet surface. Generally, intermediate curvature region 42 is free formed between base curvature region 40 and edge curvature region 44. Mathematically this can be done by numerically solving a series of differential equations in a commonly known curve fitting routine.

Spreading in the horizontal and vertical directions depends on the placement of a focal line for each direction. A separate focal line can be placed at different locations with respect to image surface 32. For example, the focal line in FIG. 4 is not shown but lies beyond image surface 32 since light rays reflected from reflecting surface 24 are converging as they reach image surface 32. If a focal line 54 were moved between image surface 32 and reflecting surface 24, light rays 56 would converge before image surface 32 and diverge when they reached image surface 32. Both the horizontal and vertical directions may have a separate and distinct focal lines which account for the horizontal and vertical spreading of the light reflected from facet 22. Since spreading of light is compensated for by the shape of facet 22, the size of facet 22 is independent of the desired light reflection.

Figure 5:
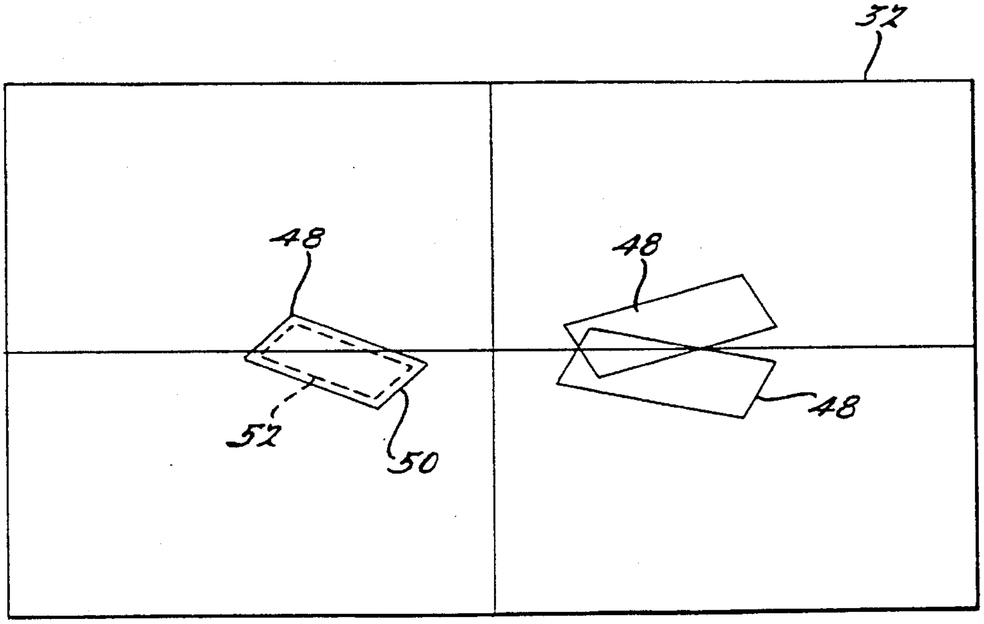
FIG. 5 is a front view of an image plane showing patterns of light reflected from elements on the reflecting surface.

Referring now to FIG. 5, image screen 32 is shown having several reflected patches 48 which correspond to images of the filament reflected from individual facets 22 on reflecting surface 24. For simplicity, only three such patches 48 are shown. One patch is shown having a solid line 50 representing the actual patch reflected by a facet 22. A dashed line 52 represents the desired patch location which is either coincident with or removed from the actual patch depending on the surface shape of facet 22. As shown, the desired patch is greater than the actual patch.

Figure 6:
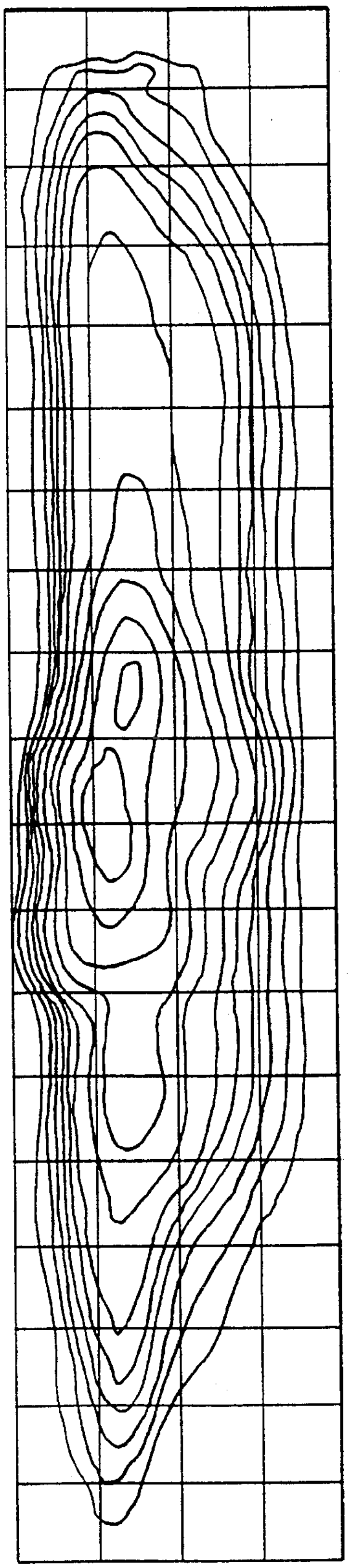
FIG. 6 is a graphical representation of the light distribution of a headlamp while in the low beam state.

Referring now to FIG. 6, a cumulative light distribution plot shows the light distribution of low beam filament 30 obtained using the present invention. Governmental bodies typically have certain criteria on light distribution. The present invention allows a lighting designer to manipulate the facets within the design constraints of the automotive vehicle while maintaining the requisite governmental light distribution standard.

Figure 7:
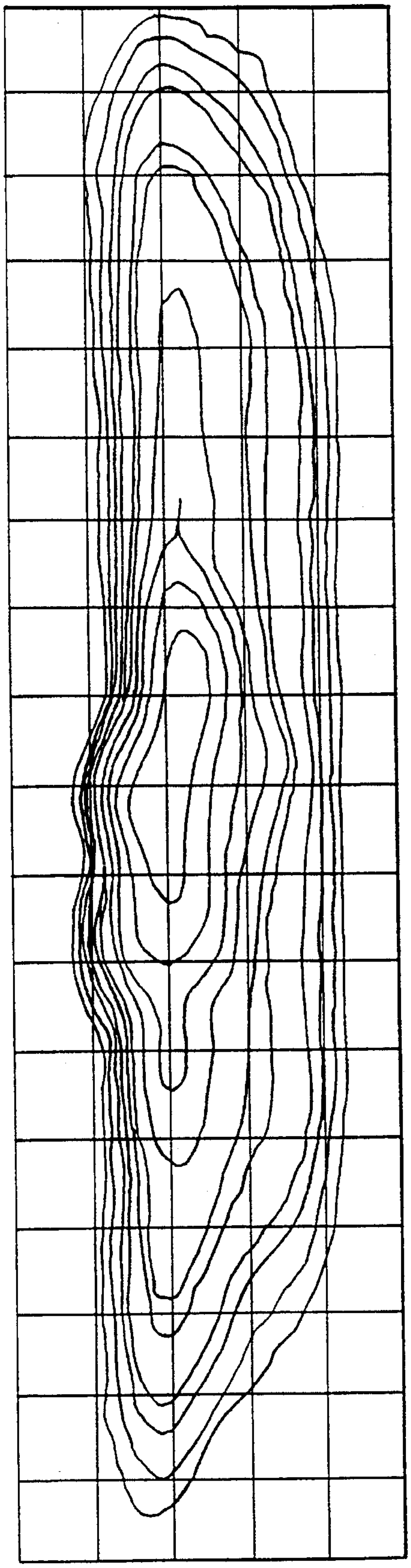
FIG. 7 is a graphical representation of light distribution of a headlamp according to the present invention in the high beam state.

Referring now to FIG. 7, light distribution standards apply equally to high beams as well. The light distribution of a high beam filament 28 is shown using the same reflective surface as in FIG. 6. Manipulation of the facets allows a designer to compensate for both the high beam and low beam applications.

Referring now to FIGS. 8 and 9, side lamp housing 19 contains a turn signal 14, a cornering lamp 16, and a retro-reflector 18. Cornering reflector 60 is used to reflect light from a cornering bulb (not shown) to an image plane (not shown) on the side of the automobile which the reflector is located. The function of cornering lamps which is known in the art is to illuminate an area on the side of the vehicle when the turn signal is on. Cornering reflector 60 is formed to reflect light from a cornering bulb 62.

Also included in side lamp housing 19 is a first turn signal reflector 64 which reflects light from a turn signal bulb 66 to the front of the vehicle. A second turn signal reflector 65 placed at an angle with respect to first turn signal reflector 64 may also be employed to reflect light from turn signal bulb 66 to the side of the vehicle.

A retro-reflector 18 may also be employed within side lamp housing 58. Since a retro-reflectors are typically required on automotive vehicles, it is desirable to incorporate retro-reflector 68 within housing 19. Retro-reflector 68 reflects light back in the same direction which it originated.

A transparent cover 70 is placed over the whole assembly. Transparent cover 70 does not significantly affect the light distribution of the light reflector.

The present invention is intended to include modifications which would be apparent to those skilled in the art. For example, the actual implementation of the reflective surface may find applications such as tail lamps or some interior applications which were not specifically mentioned above.

What is claimed is:

1. A lamp for an automotive vehicle comprising:

a concave housing;

a first light source;

a cornering reflector located in a predetermined position with said housing and said first light source, said cornering reflector having a first image surface;

said cornering reflector having a plurality of adjacent cornering facets placed in a predetermined relationship to said first light source, each cornering facet illuminating a predetermined area of said first image surface; each cornering facet having:

a plurality of cornering facet edges bounding each cornering facet, each cornering facet edge joining a cornering facet edge of an adjacent cornering facet to define a common cornering facet edge between the two adjacent cornering facets;

a base curvature surface portion formed on each cornering facet disposed in a predetermined relation to said first light source and said first image surface for illuminating a predetermined first area of said first image surface;

a first edge curvature surface portion of each cornering facet adjacent said cornering facet edges for illuminating a second area of said first image surface displaced in predetermined angular relation to said first base portion; and a first intermediate curvature surface portion of each cornering facet continuously and smoothly connecting said first base curvature surface portion and said first edge curvature surface portion for illuminating a third area between said first area and said second area of said first image plane;

a retro-reflector located in a predetermined position within said housing;

a second light source;

a turn signal indicator reflector located in a predetermined position with said housing and said second light source, said turn signal reflector having a second image surface;

said turn signal indicator reflector having a plurality of adjacent turn signal facets placed in a predetermined relationship to said second light source, each turn signal facet illuminating a predetermined area of said second image surface;

each turn signal facet having:

a plurality of turn signal facet edges bounding each turn signal facet, each turn signal facet edge joining a turn signal facet edge of an adjacent turn signal facet to define a common turn signal facet edge between the two adjacent turn signal facets;

a second base curvature surface portion formed on each turn signal facet disposed in a predetermined relation to said second light source and said image surface for illuminating a predetermined first area of said second image surface;

a second edge curvature surface portion of each turn signal facet adjacent said turn signal facet edges for illuminating a second area of said second image surface displaced in predetermined angular relation to said second base portion; and a second intermediate curvature surface portion of each turn signal facet continuously and smoothly connecting said second base curvature surface portion and said second edge curvature surface portion for illuminating a third area between said first area and said second area of said second image plane.

2. A lamp as recited in claim 1 further comprising a transparent cover secured to said housing over said cornering reflector, said turn signal reflector and said retro-reflector.

* * * * *